United States Patent [19]

Eriksson et al.

[11] Patent Number: 5,786,787

[45] Date of Patent: Jul. 28, 1998

[54] METHOD FOR DETERMINING THE COURSE OF ANOTHER VEHICLE

[75] Inventors: Lars Eriksson, Stockholm; Bert-Eric Tullsson, Järfälla, both of Sweden

[73] Assignee: Celsiustech Electronics AB, Jarfalla, Sweden

[21] Appl. No.: 750,588

[22] PCT Filed: Jun. 7, 1995

[86] PCT No.: PCT/SE95/00660

§ 371 Date: Dec. 6, 1996

§ 102(e) Date: Dec. 6, 1996

[87] PCT Pub. No.: WO95/34830

PCT Pub. Date: Dec. 21, 1995

[30] Foreign Application Priority Data

Jun. 7, 1994 [SE] Sweden ............................ 9401964

[51] Int. Cl.$^6$ ............................ G01S 13/93; G01S 13/60
[52] U.S. Cl. ............................ 342/70; 342/107; 342/146
[58] Field of Search ............................ 342/69, 70, 71, 342/72, 107, 113, 115, 146

[56] References Cited

U.S. PATENT DOCUMENTS

| 5,249,157 | 9/1993 | Taylor | 340/903 |
|---|---|---|---|
| 5,321,407 | 6/1994 | Kikuchi et al. | 342/70 |
| 5,343,206 | 8/1994 | Ansaldi et al. | 342/70 |
| 5,375,336 | 12/1994 | Nakamura | 33/324 |
| 5,534,870 | 7/1996 | Avignon et al. | 342/70 |

OTHER PUBLICATIONS

Struik, Differential Geometry, Addison–Wesley 1950, p. 201.

*Primary Examiner*—John B. Sotomayor
*Attorney, Agent, or Firm*—Pollock, Vande Sande & Priddy

[57] ABSTRACT

A method for determining the course of another vehicle in relation to one's own vehicle by measuring the position of the other vehicle in relation to one's own vehicle with a transmitter/receiver system, such as a radar system permits course determination both on straight and on bend segments. According to the method, the side location of the other vehicle and one's own vehicle is determined at a position where the other vehicle is level with one's own vehicle, by moving the front vehicle backwards in time and/or moving the rear vehicle forwards in time, on the basis of position measurements of the position of the other vehicle. The side location of the other vehicle is compared with the side location of one's own vehicle, by which a measure of the discrepancy between the course of the other vehicle and the course of one's own vehicle is obtained. According to the invention, the position where the other vehicle is level with one's own vehicle may be determined on the basis of the inertial speed vector of the other vehicle at one or more points in time.

16 Claims, 2 Drawing Sheets

METHOD FOR DETERMINING THE
COURSE OF ANOTHER VEHICLE

FIELD OF THE INVENTION

The present invention relates to a method for determining the course of another vehicle in relation to one's own vehicle by measuring the position of the other vehicle in relation to one's own vehicle by a transmitter/receiver system, such as a radar system, including the following steps being carried out:

a) the position of the other vehicle is determined by position measurements, b) on the basis of position measurements carried out in accordance with step a), the side location of the other vehicle and one's own vehicle is determined at a position where the other vehicle is level with one's own vehicle, by moving the front vehicle backwards in time and/or moving the rear vehicle forwards in time, c) the side location at the position determined in accordance with step b) is compared with the side location of one's own vehicle, and d) the difference in the side locations in accordance with step c) between one's own vehicle and the other vehicle is used as a measure of the discrepancy between the course of the other vehicle and the course of one's own vehicle.

BACKGROUND OF THE INVENTION

In order to increase road safety, intensive work is being carried out towards finding systems which improve safety. In this connection, it has been proposed, among other things, to use radar technology in cars, so-called car radar. In a cruise control system, the car radar can help the driver to keep a sufficient distance from the vehicle in front, can warn of vehicles approaching from behind, and, in a further perspective, can form part of a more general collision-prevention system. One problem in this connection is that of determining the course of the cars in front. Straight sections ahead can be monitored relatively easily. The problems become greater when a vehicle in front is going into and following a bend. The system should be able to follow the vehicle regardless of the curvature of the road. A method of the type mentioned in the first paragraph of the description is already known from the U.S. Pat. No. 5,249,157.

For use in cruise control systems, it is important that the system also functions when the distance in relation to the vehicle in front remains constant, i.e. when the closing speed=0, and in situations with short increasing distances. The method according to the cited U.S. Pat. No. 5,249,157 crucially makes use of prediction of the "intercept time" as determined by the ratio between the distance separating the vehicles and the closing speed. A disadvantage of this known method is that the "intercept time" cannot be determined when the closing speed is zero, which is a common situation with cruise control systems.

A study of the road network shows that, over large parts of their length, the majority of roads can be approximated with great accuracy to straight and circular segments. Bends which do not have circular segments are considered awkward to negotiate, since the driver's handling of the steering wheel has to be corrected through the bend, and they are therefore uncommon. A circular bend segment can be defined in a known manner as having a constant center of curvature and a constant radius of curvature. By contrast, other parts of the road, including straight segments, cannot be defined in this way.

The curvature of a bend is a measure of the rate at which the tangent vector changes direction. The curvature is therefore expressed by second derivatives (accelerations), where transversal accelerations (angular accelerations and magnitudes derived therefrom) are especially important. Angular accelerations determined from angle measurements are generally very noisy signals. This is especially the case if radar sensors are used. In the method according to the U.S. patent referred to above, the angular acceleration is determined in accordance with the above as a second derivative. Consequently, advantageous methods for course determination should function on curving roads, and yet not use angular accelerations, and, taking into consideration non-circular road sections, including straight sections, should not use expressions for radii of curvature.

When holding speed with respect to a vehicle in front, the distance is constant. If both vehicles lie simultaneously within a circular bend segment, the vehicle in front is additionally observed at a constant angle, and it therefore has a relative movement equal to zero both in terms of distance and in terms of angle. For this reason, observing only the relative movement when following at constant speed does not permit to distinguish between circular bend segments and straight roads.

SUMMARY OF THE INVENTION

The object of the present invention is to provide a method for determining the course of another vehicle, which does not have the shortcomings discussed above and found in the known systems.

The invention is based on using, for the purpose of course determination, the inertial speed vector of the other vehicle, i.e. its speed vector over ground. The method is characterized in that the position where the other vehicle is level with one's own vehicle is determined on the basis of the other vehicle's inertial speed vector (speed vector over ground) at one or more points in time. The components of this inertial speed vector can be determined, in a manner familiar to one skilled in the art, by means of the relative movement in terms of distance and angle being corrected with the speed and rotation of one's own vehicle. The rotation can be measured by a sensor which measures angular velocity, a so-called yaw rate sensor.

On straight roads the other vehicle has no inertial speed component transverse to the direction of movement of one's own vehicle. This is not the case with a bend. In order to identify the beginning and ending of bends, changes in the inertial transversal velocity of the vehicle in front can advantageously be detected.

In an advantageous method for course determination, the side location of the other vehicle, when it is level with one's own vehicle, is determined by extending the inertial speed vector of the other vehicle in the direction of one's own vehicle to a length which is a certain proportion k of the distance between one's own vehicle and the other vehicle.

For an arc of a circle, the tangents at the end points of the arc intersect each other outside the midpoint of the bend. This applies also to a line section. Thus, the above-mentioned proportion is 0.5 for arcs of circles and straight lines. If the vehicles are moving along a circular bend segment, the method gives side locations which are equivalent to side locations obtained by calculations based on knowledge of the center of curvature and radius of curvature. However, the present method does not make use of such knowledge. The proportion k can be determined continuously on the basis of current measurements and earlier measurements of the other vehicle's inertial speed vector and distance. This provides, for example, the possibility of special values for k when the entry into, and exit from, bends have been identified. According to an advantageous method based on point identification in accordance with the above, the proportion is constant. A particularly advantageous method is obtained in this respect when the proportion k is a constant in the range $0.4 \leq k \leq 0.6$. The range includes k=0.5, which is the correct value for circular and rectilinear bend segments.

According to a further advantageous method, the position where the vehicle in front and one's own vehicle are level can be determined by time integration in two directions, where one direction, the x direction, corresponds to the direction of movement of one's own vehicle, and the other direction corresponds to a direction at right angles to the direction of movement of one's own vehicle, i.e. the y direction or lateral direction. The method is characterized in that, on the basis of position measurements which have been carried out, the inertial speed vector of the other vehicle is determined during a period of time corresponding to at least the time gap between the other vehicle and one's own vehicle, and the other vehicle and one's own vehicle are moved level with each other by means of performing time integration in the longitudinal direction, until the other vehicle is situated level with one's own vehicle, and at the same time performing integration in the transverse direction, where the longitudinal direction corresponds to the direction of travel of one's own vehicle, and the transverse direction corresponds to a direction at right angles to the direction of travel. This method does not require that the road be approximated to consist of straight and circular segments, but instead the method is completely independent of the curvature of the road.

The position where the other vehicle is level with one's own vehicle can advantageously be determined using several variants of the same basic principle, for example with one variant being used for relatively short distances and another for relatively long distances. It is also possible to weigh together calculations which have been made in accordance with two different variants. In this context, relatively short distances can be taken as distances up to the order of magnitude of a hundred meters, while relatively long distances can be taken as distances of about a hundred meters and upwards.

BRIEF DESCRIPTION OF THE DRAWINGS

The invention will be described in greater detail below with reference to the attached drawings, in which.

DETAILED DESCRIPTION OF THE PREFERRED EMBODIMENT(S)

Figure 1:
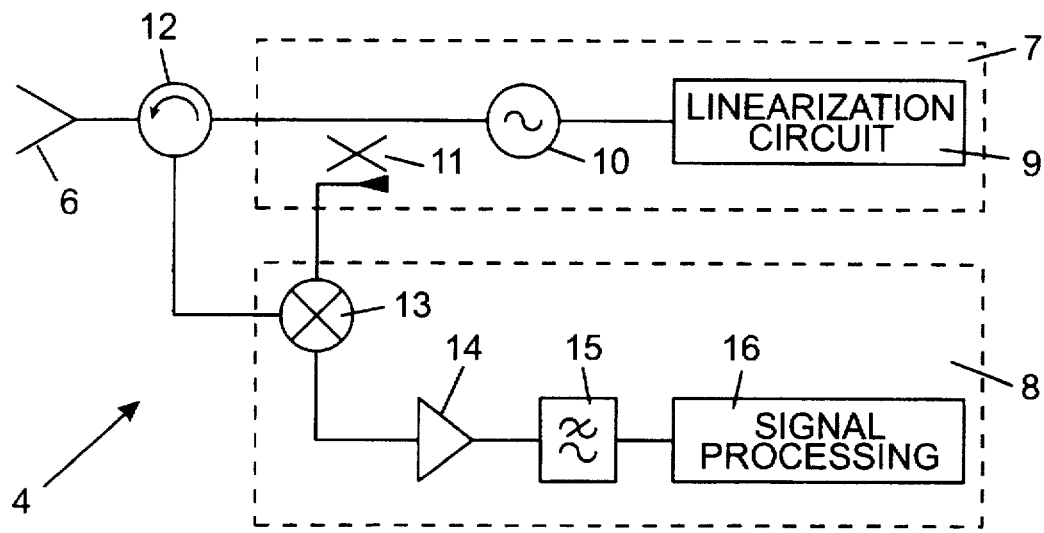
FIG. 1 shows a schematic block diagram of a car radar.

The car radar 4 shown in FIG. 1 comprises an aerial 6, a transmitter part 7 and a receiver part 8. The aerial 6 is preferably mounted at the front of the vehicle and includes for example, of a mechanically scanning reflector aerial of the Cassegrain type. The transmitter part includes a linear-ization circuit 9 and an oscillator 10. The oscillator preferably generates a signal in the gigahertz range, for example 77 GHz, which signal is conveyed to the aerial 6 via a directional coupler 11 and a circulator 12. A reflected signal received by the aerial is conveyed via the circulator 12 to a mixer 13 where the received signal is mixed with the transmitted signal. After amplification 14, filtering 15 and signal processing 16, the distance r and the direction a with respect to the vehicle in front, in accordance with the definition below, can be obtained, among other things, in accordance with known radar principles, as can information, if so required, on the relative speed of the vehicle in front.

A first method according to the present invention, using side location determination by identification of a point between one's own vehicle and the other vehicle, is described below with reference to FIGS. 2 and 3.

Figure 2:
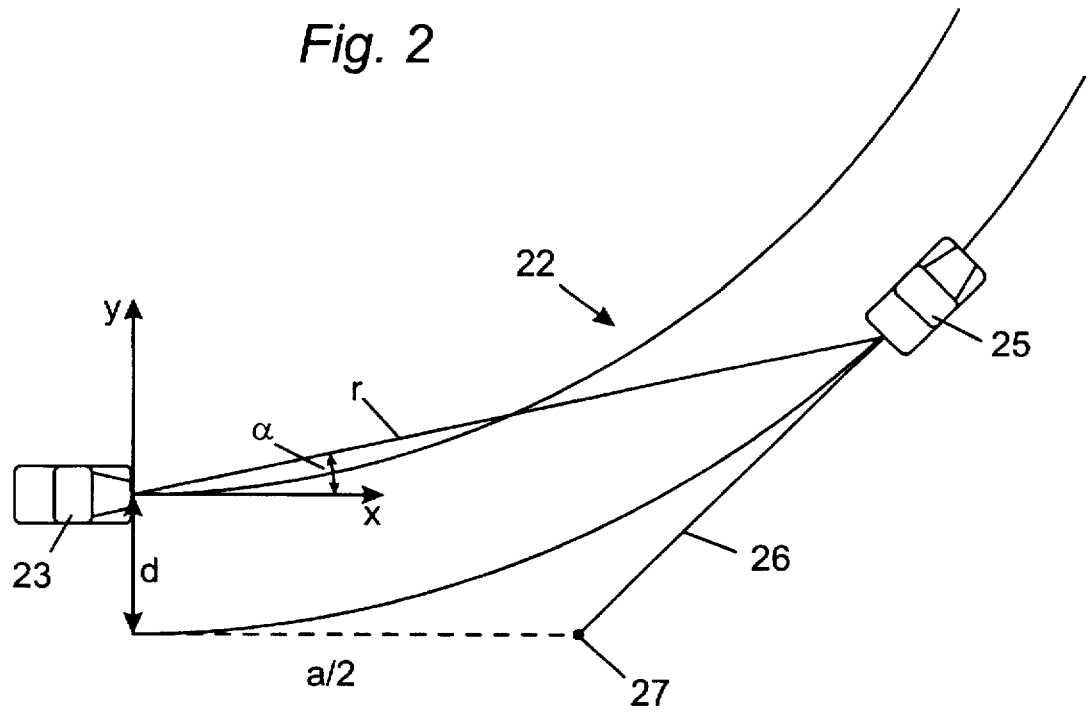
FIG. 2 and FIG. 3 illustrate a first method according to the invention with side location determination by identification of a point between one's own vehicle and the other vehicle.

In FIG. 2, a first vehicle 23, referred to hereinafter as one's own vehicle or the host vehicle, is situated in a bend section 22 together with another vehicle 25, which in this case is in front. The first vehicle 23 is provided with a car radar according to the block diagram shown schematically in FIG. 1. The distance between the two vehicles has been designated by r, and α designates the direction to the front vehicle 25 in relation to the direction of travel of the host vehicle 23. The transverse distance with respect to the vehicle in front, i.e. the difference in the lateral direction, has been designated by d. A Cartesian system of coordinates is assigned to the host vehicle 23, with the x axis lying in the direction of travel of the host vehicle. It is assumed that the position and speed of the vehicle in front are known through measurement principles described above.

From the front vehicle 25, a line 26 is drawn straight back (in the direction of the tangent) to a point 27 at the same distance a/2 from the front vehicle 25 and one's own vehicle 23. It is evident from FIG. 2 that the point 27 has the same side location relative to one's own vehicle as to a front vehicle which has been moved backwards in time along a circular bend segment. The difference in side location between the vehicles can be determined in this way. For bend segments of small curvature, which is usually the case, the distance r between the vehicles is approximately equal to a ($r \approx a$).

For an arc of a circle, as illustrated in FIG. 2, the tangents at the end points of the arc intersect each other outside the midpoint of the bend. The proportion k of the distance between one's own vehicle and another vehicle is in this case equal to 0.5.

Figure 3:
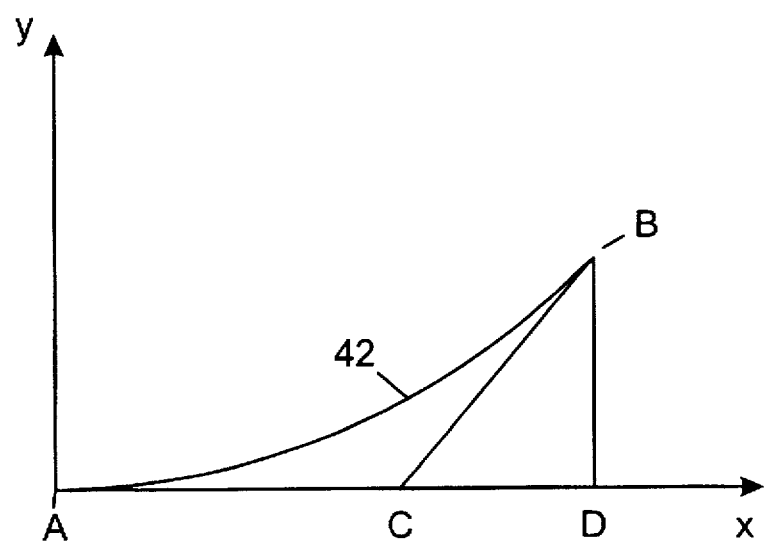

The following analysis with reference to FIG. 3 gives a necessary condition for the equations for bends having a certain constant proportion k, where the tangents at the end points A, B of an arbitrary bend section 42 intersect each other at a point C which divides the distance between the end points into parts whose lengths have a ratio of (1−k) to k.

Assume that the bend section is given by y=f(x). Select units so that one end point A of the bend section 42 is at the origin (0,0). By changing over to the function $g(x)=f(x)-x*f'(0)$, the analysis can be reduced to the case where the tangential direction at the origin is horizontal. Assume further that the function g and its derivative g' are such small sums that the distance along the bend y=g(x) can be approximated to the distance along the x axis.

The tangent at the bend section's other end point B=(x, y), where x>0 and y=g(x), will intersect the x axis (=the tangent at the other end point, origin) at the point C=((1−k)*x, 0). If g(x)=0 identically, i.e. the bend AB, is a straight line, this is complied with irrespective of the value of k. Otherwise, according to the triangle BCD, where D=(x, 0) and the line CD has the length k*x. BD/CD=g(x)/(k*x)=g'(x).

This relation, which applies for all values of x, gives the differential equation $$g'(x)/g(x)=1/k*1/x$$

with the solution ln|g(x)|=(1/k)*ln|x|+C, i.e.

$$g(x)=(\pm)\ exp(C)*x^{1/k}$$

k=0.5 gives a parabolic curve with constant second derivative, i.e. a small angle approximation of an arc of a circle having constant curvature. This is a necessary condition in the case where k=0.5. It is easy to see that this is also sufficient.

The bends for which it holds true that the tangents at the end points of an arbitrary bend section intersect each other outside the middle of the bend section, are therefore (small angle approximations of) bends of constant curvature (including straight lines which have 0 curvature). This characterization of bends of constant curvature does not exploit the fact that the value of a radius of curvature is known.

For bend segments where the curvature increases with the road distance covered, k is <½ and not constant over the bend segment, but instead can also depend, for example, on the distance between the points (the vehicles). An example of such a bend is a so-called clothoid (Cornu spiral; see Struik, Differential Geometry, Addison-Wesley 1950, p 201), where the curvature increases with the arc length from the point of symmetry. Such a bend can be approximated locally to a third degree bend, and can be considered as a transition bend between a straight line section and a bend. In the same way, k>½ when the curvature decreases with the road distance covered. An advantageous method for side location determination can therefore use k<½, for example when the entry into a bend is detected, and can use k>½, for example when transition from a bend to a straight road is detected, the distance also being used in the determination of the instantaneous k value.

Figure 4:
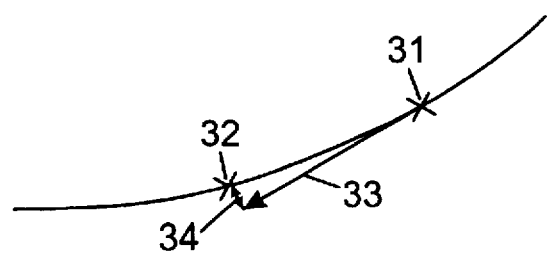
FIG. 4 illustrates a second method according to the invention with side location determination in accordance with a time integration principle.

The integration principle illustrated in FIG. 4 builds on the relationship that $$\text{road=time integral of speed=sum of } [v(t)*dt]$$

The figure shows how a displacement backwards in time from a first point 31 to a second point 32 along a stretch of road can be divided into two components 33 and 34. The component 33 corresponds to a displacement backwardly in the x direction, while the component 34 corresponds to a displacement backwardly in the y direction, where the y direction corresponds to displacement in the lateral direction, and the x direction corresponds to a displacement at right angles to the lateral displacement. By observing the transversal and longitudinal speeds of the vehicle in front for a period of time, the vehicle in front can thus be moved backwardly in the x direction until it is situated level with one's own vehicle. Integration in the length corresponding to the y direction gives the side location. The integration principle in accordance with the above can be applied irrespective of the curvature of the road.

Since one's own vehicle does not have any fixed system, but instead its own system of coordinates which is turned with the movements of the vehicle, correction should be made for the movements of one's own vehicle. In the integration (=summation), the speeds are therefore resolved depending on how one's own vehicle has turned since the speeds were measured. This turning is given as the time integral of the signal from the yaw rate sensor of one's own vehicle. The resolution can often be performed using so-called small angle approximations, i.e. using the approximations sin(x)=x and cos(x)=1.

The invention has been described above for radar frequencies, but it is not in any way limited to this range, and instead completely different frequency ranges are conceivable, including the laser frequency range. In the exemplary embodiments discussed above, the vehicle in front has been moved backwardly in time throughout. It is possible, for example, at least in certain applications, for one's own vehicle to be moved forwardly in time or for both the vehicles to be moved in time to a position where they are situated level.

We claim:

1. A method for determining the course of another vehicle in relation to one's own vehicle by measuring the position of the other vehicle in relation to one's own vehicle with a transmitter/receiver system, said method comprising the steps of:

a) determining the position of the other vehicle by position measurements, b) determining the side location of the other vehicle and one's own vehicle at a position where the other vehicle is level with one's own vehicle on the basis of said position measurements by moving at least one of 1) the front vehicle backwardly in time and 2) the rear vehicle forwardly in time, c) comparing the side location of the other vehicle at the position determined in step b) with the side location of one's own vehicle, and d) using the difference in the side locations between one's own vehicle and the other vehicle as a measure of the discrepancy between the course of the other vehicle and the course of one's own vehicle, and wherein the position where the other vehicle is level with one's own vehicle is determined on the basis of the other vehicle's inertial speed vector at one or more points in time.

2. A method according to claim 1, wherein the inertial speed vector of the other vehicle is determined by means of the observed relative movement in terms of distance and angle being corrected in response to the speed and rotational speed of one's own vehicle.

3. A method according to claim 2, wherein the rotational speed of one's own vehicle is measured by a sensor.

4. A method according to claim 3, wherein said sensor measures angular velocity.

5. A method according to claim 1, wherein the position where the other vehicle is level with one's own vehicle is determined by identifying that point on the line passing through the other vehicle and directed along the other vehicle's momentary inertial speed vector, which lies between one's own vehicle and the other vehicle and whose distance from the other vehicle is a certain proportion k of the distance between one's own vehicle and the other vehicle, wherein the proportion k is determined as a function of the distance and the other vehicle's current and earlier inertial speed vectors, and wherein the point's side location corresponds to the side location of the other vehicle level with one's own vehicle.

6. A method according to claim 5, wherein the proportion k is constant.

7. A method according to claim 6, wherein the proportion k is a constant in the range of $0.4 \leq k \leq 0.6$.

8. A method according to claim 4, wherein the position where the other vehicle is level with one's own vehicle can be determined also by different method.

9. A method according to claim 4, wherein the position where the other vehicle is level with one's own vehicle is determined for distances within a certain distance range.

10. A method according to claim 1, wherein on the basis of position measurements, the inertial speed vector of the other vehicle is determined over a period of time corresponding to at least the time gap between the other vehicle and one's own vehicle, and wherein the other vehicle and one's own vehicle are moved level with each other by performing time integration in the longitudinal direction until the other vehicle is situated level with one's own vehicle, and at the same time performing integration in the transverse direction, where the longitudinal direction corresponds to the direction of travel of one's own vehicle, and the transverse direction corresponds to a direction at right angles to the direction of travel.

11. A method according to claim 10, wherein time integration of the inertial speed vector of the other vehicle is resolved to a new system of coordinates in order to compensate for the rotational movements of one's own vehicle.

12. A method according to claim 11, in which the resolution is performed on the basis of recorded signals from a sensor which measures an angular velocity (yaw rate sensor).

13. A method according to claim 12, wherein in the resolution, the small angle approximations $\sin(x)=x$ and $\cos(x)=1$ are used.

14. The method according to claim 10, wherein the position where the other vehicle is level with one's own vehicle can be determined by a different method.

15. A method according to claim 4, wherein the position where the other vehicle is level with one's own vehicle is determined for relatively short distances.

16. A method according to claim 9, wherein the position where the other vehicle is level with one's own vehicle is determined for relatively long distances.

* * * * *